No. 763,686. PATENTED JUNE 28, 1904.
N. H. MEDBERY.
FLUID SWITCH.
APPLICATION FILED AUG. 21, 1903.
NO MODEL. 7 SHEETS—SHEET 1.

Witnesses:
Geo. W. Young.
Chas. L. Goss.

Inventor:
Nelson H. Medbery.
By Winkler Flanders Smith Bottum & Vilas,
Attorneys.

No. 763,686. PATENTED JUNE 28, 1904.
N. H. MEDBERY.
FLUID SWITCH.
APPLICATION FILED AUG. 21, 1903.
NO MODEL. 7 SHEETS—SHEET 2.

Witnesses:
Geo. W. Young.
Chas. L. Goss.

Inventor:
Nelson H. Medbery,
By Winkler Flanders Smith Bottum & Vilas
Attorneys.

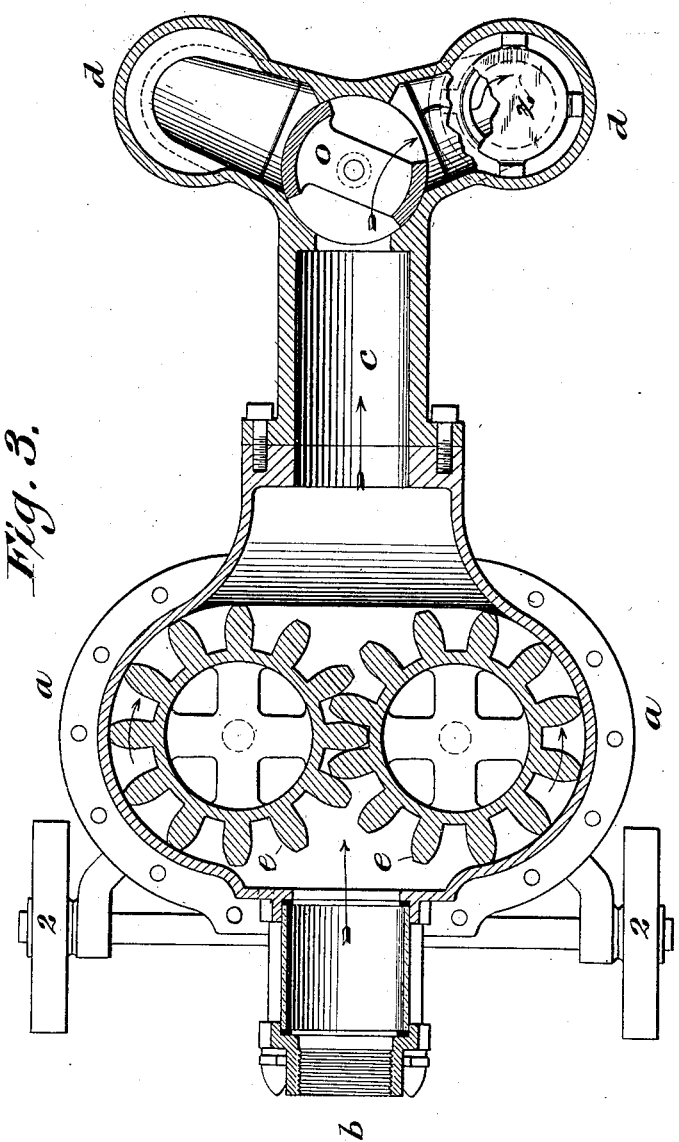

No. 763,686. PATENTED JUNE 28, 1904.
N. H. MEDBERY.
FLUID SWITCH.
APPLICATION FILED AUG. 21, 1903.
NO MODEL. 7 SHEETS—SHEET 4.
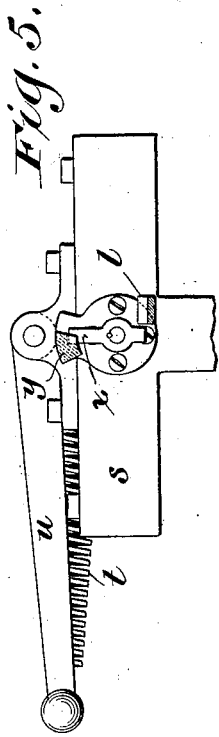
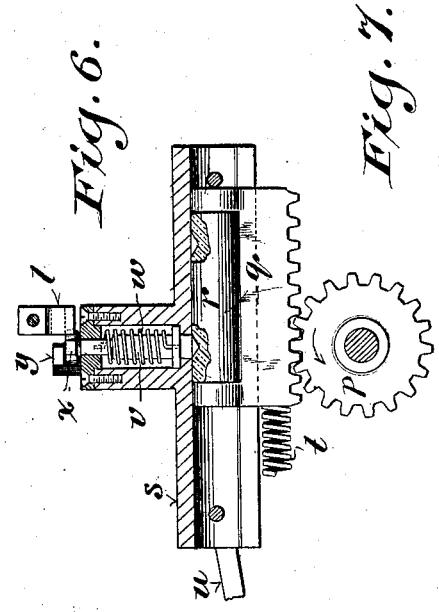
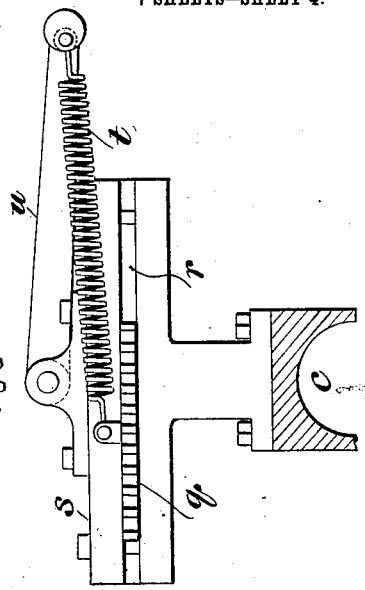
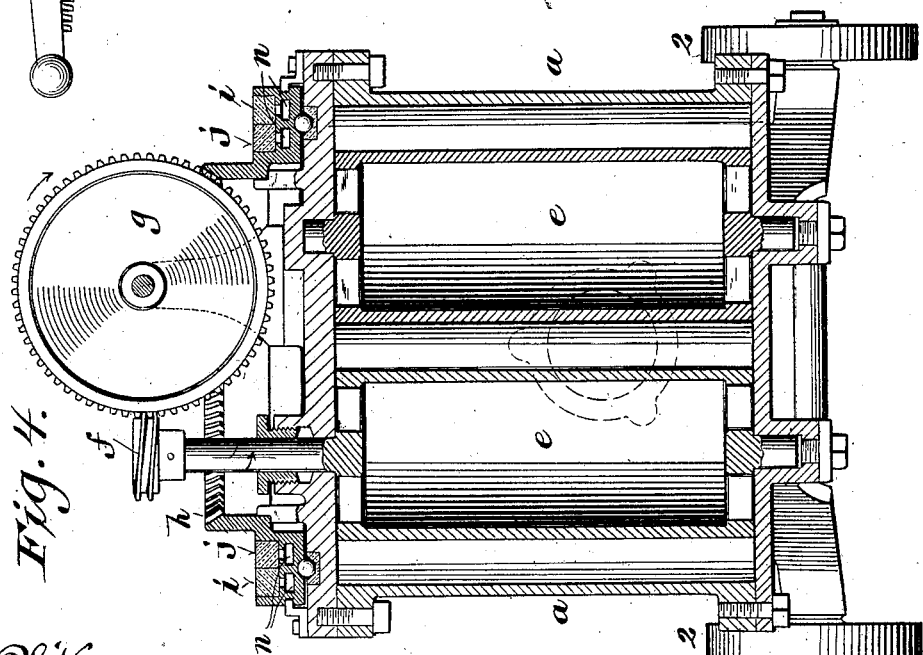
Witnesses:
Geo. W. Young.
Chas. T. Goss.
Inventor:
Nelson H. Medbery
By Winkler Flanders Smith Bottum King
Attorneys.

No. 763,686. PATENTED JUNE 28, 1904.
N. H. MEDBERY.
FLUID SWITCH.
APPLICATION FILED AUG. 21, 1903.
NO MODEL. 7 SHEETS—SHEET 5.
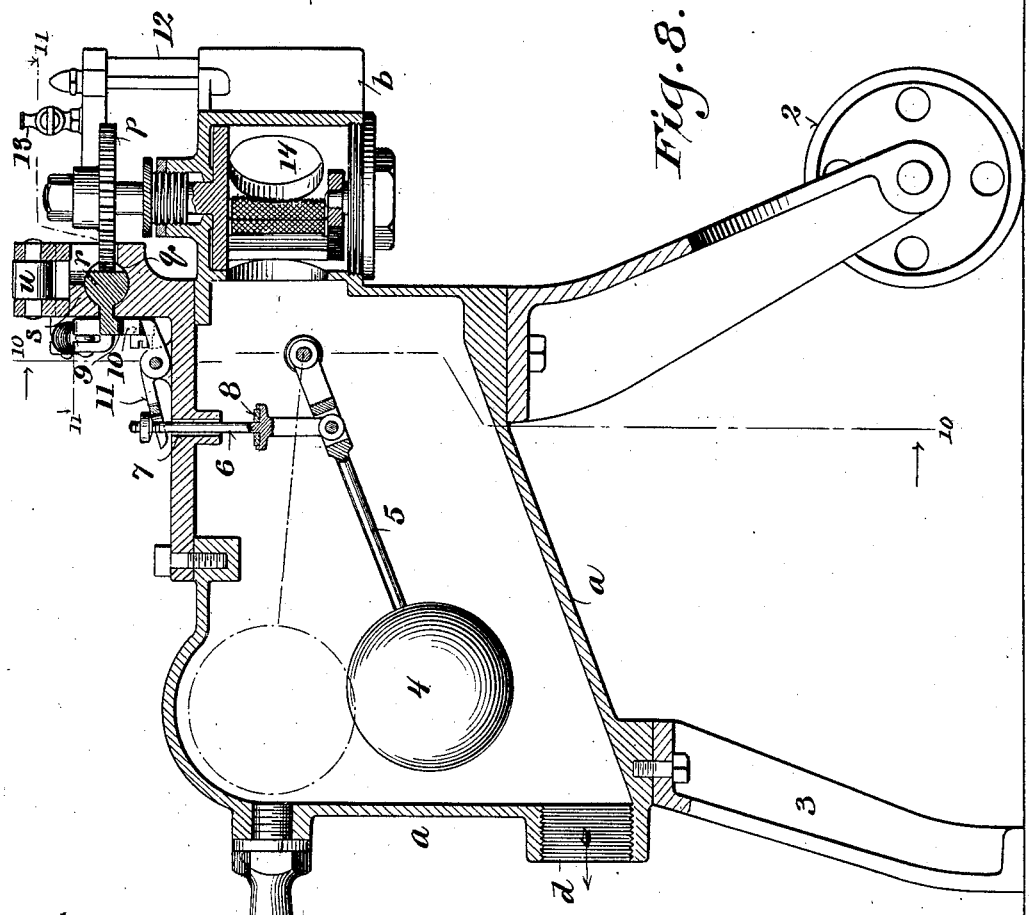

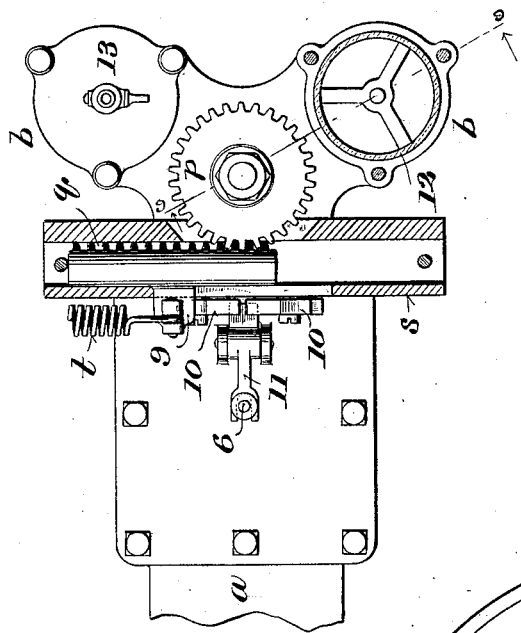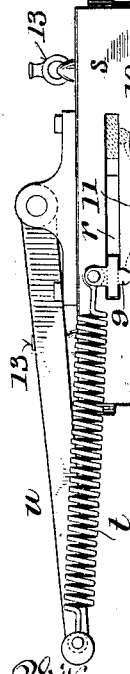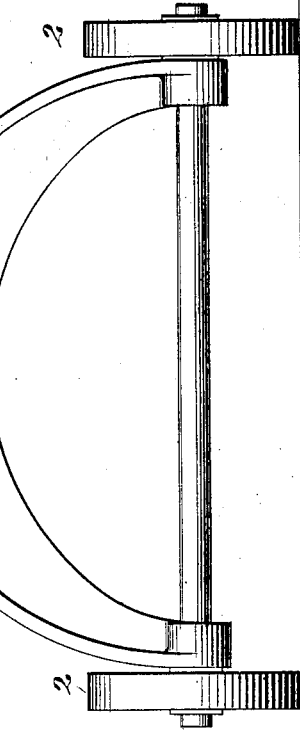

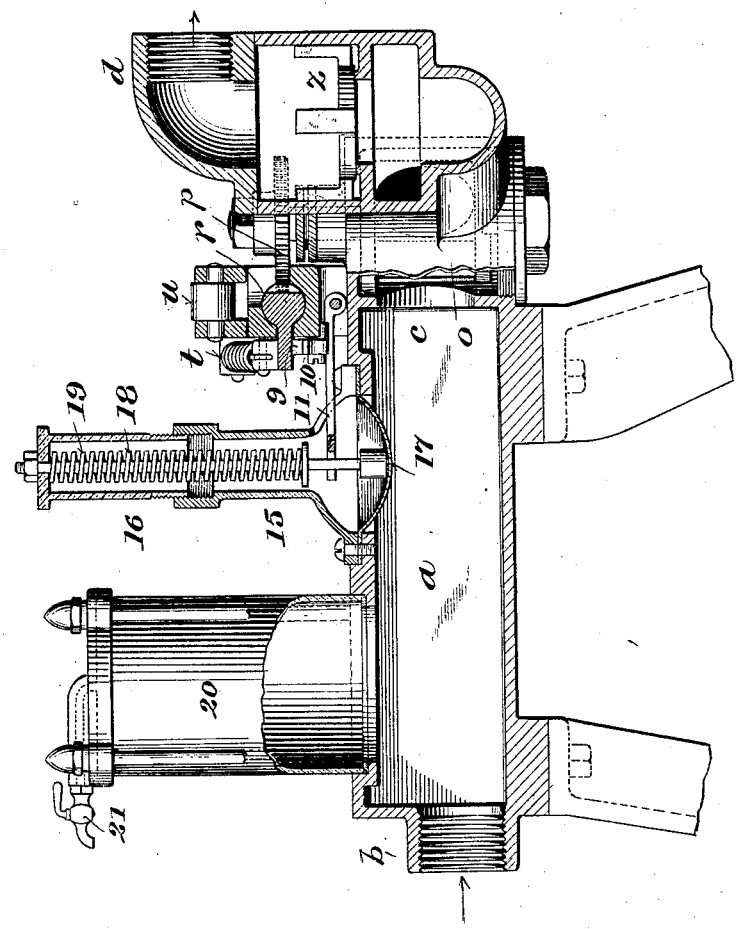

No. 763,686. Patented June 28, 1904.

UNITED STATES PATENT OFFICE.

NELSON H. MEDBERY, OF MILWAUKEE, WISCONSIN.

FLUID-SWITCH.

SPECIFICATION forming part of Letters Patent No. 763,686, dated June 28, 1904.

Application filed August 21, 1903. Serial No. 170,312. (No model.)

*To all whom it may concern:*

Be it known that I, NELSON H. MEDBERY, a citizen of the United States, residing at Milwaukee, in the county of Milwaukee and State of Wisconsin, have invented certain new and useful Improvements in Fluid-Switches, of which the following is a specification, reference being had to the accompanying drawings, forming a part thereof.

The main object of this invention is to automatically change the flow of fluid from one supply or delivery passage to another, according to predetermined conditions, rate of flow, liquid-level, pressure, &c.

It consists in certain novel features of construction and in the peculiar arrangement and combinations of parts, substantially as hereinafter described, and pointed out in the claims.

In the accompanying drawings like characters designate the same or similar parts in the several figures.

Figure 1:
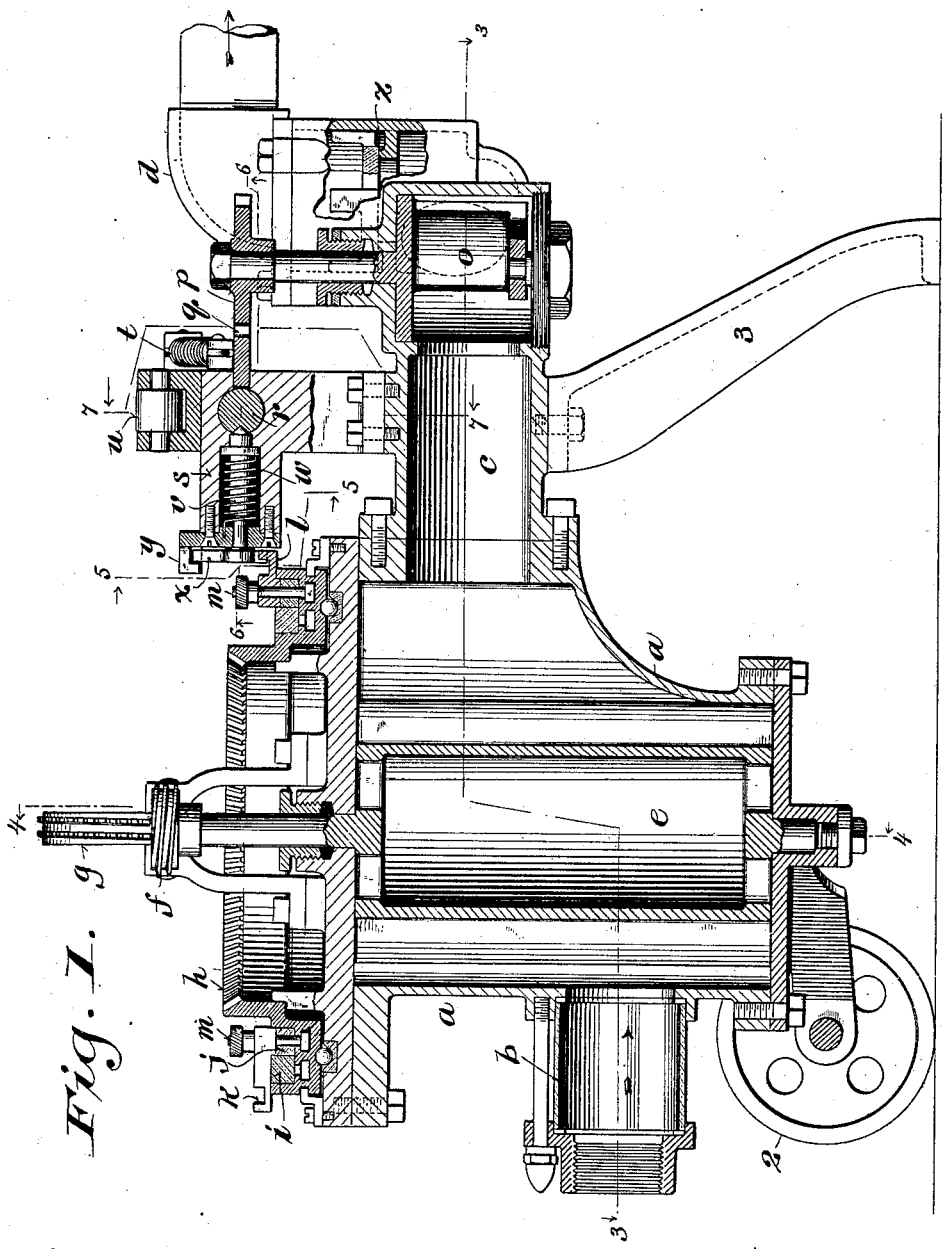
Figure 2:
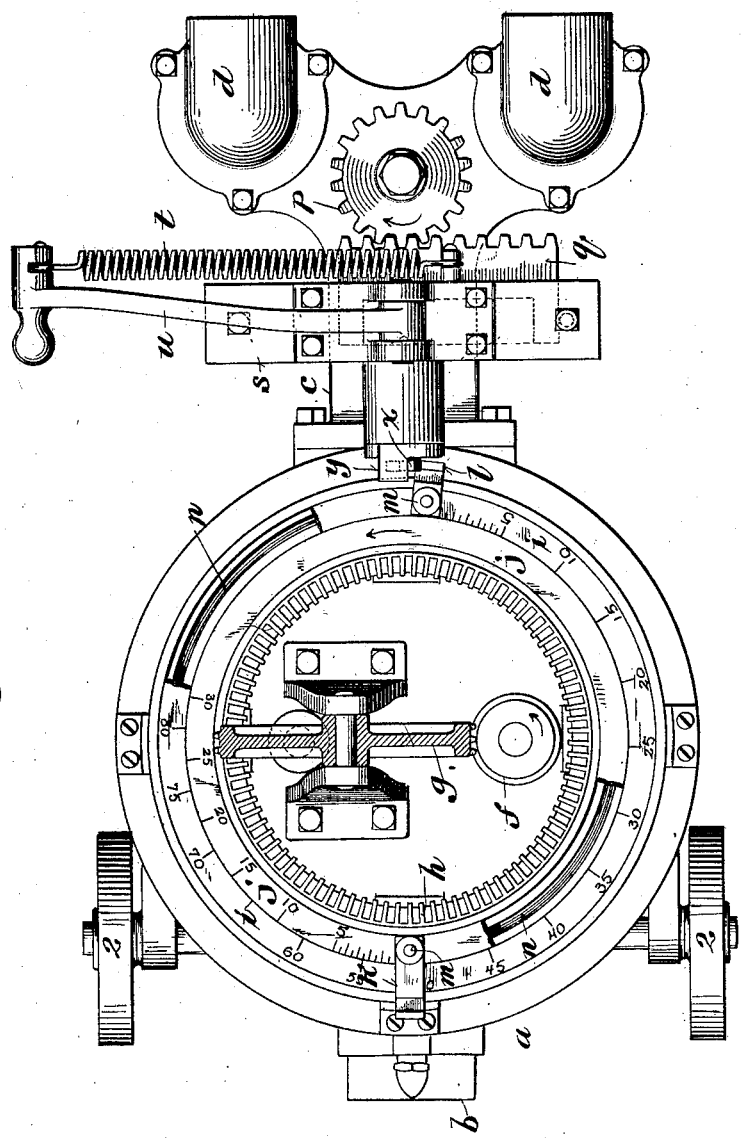

Figure 1 is a vertical longitudinal section of one form of apparatus embodying the invention and designed to divert the flow of fluid from one passage to another, according to the rate of flow or when a predetermined volume has passed a certain point. Fig. 2 is a plan view of the same. Fig. 3 is a horizontal section on the line 3 3, Fig. 1. Fig. 4 is a vertical cross-section on the line 4 4, Fig. 1; and Figs. 5, 6, and 7 are detail views of the valve locking, releasing, and shifting mechanism, being sections on the lines 5 5, 6 6, and 7 7, respectively, Fig. 1. Fig. 8 is a vertical longitudinal section of another form of apparatus embodying the invention and designed to divert the flow of fluid from one passage to another, according to variation in liquid-level. Fig. 9 is a vertical section on the line 9 9, Fig. 11, of the fluid-controlling valve and one of the supply connections. Fig. 10 is a vertical cross-section on the line 10 10, Fig. 8. Fig. 11 is a horizontal section on the line 11 11, Fig. 8, showing the valve locking, releasing, and reversing mechanism; and Fig. 12 is a vertical longitudinal section of still another form of apparatus embodying the invention and designed to divert the flow of fluid from one passage to another, according to variation in pressure.

Referring to Figs. 1 to 7, inclusive, $a$ is a case inclosing a chamber and provided on one side with a supply connection $b$ and on the other side with a delivery connection $c$, terminating in two branches $d$. These connections are provided with suitable couplings for the attachment of pipe or hose. The supply connection $b$ preferably has a glass or transparent section for observing the condition of the fluid passing through the apparatus and determining whether the apparatus is operating properly. Two intermeshing meter-wheels $e$ are fitted in said chamber between its supply and delivery connections $b$ and $c$. On the journal of one of these wheels is fixed a worm $f$, which engages with a compound gear and worm $g$, supported by brackets on top of the case $a$. The worm of the gear $g$ engages with an annular worm-gear $h$, mounted horizontally on said case and preferably supported thereon by ball or roller bearings, as shown in Figs. 1 and 4. In the extended rim of the gear $h$ are fitted two independently-adjustable concentric rings $i$ and $j$, which are preferably graduated on top, as shown in Fig. 2, and are provided with trip-blocks $k$ and $l$. These blocks are secured to the rings, and the rings are fastened in place when adjusted as desired by bolts $m$, the heads of which engage with annular undercut grooves $n$ in the rim of the gear $h$ and by nuts threaded on the upper ends of said bolts. $o$ is a rotary valve fitted to turn in a chamber at the junction of the delivery-passage $c$ and its branches $d$ and adapted to divert the flow of fluid from one of said branches to the other. The upwardly-projecting stem of said valve is provided with a pinion $p$, meshing with a rack $q$ on a reciprocating slide $r$. The slide $r$ is fitted in a slotted guideway $s$ upon and transverse to the delivery connection $c$. A spring $t$ is attached at one end to said rack and slide and at the other end to an arm $u$, which is pivoted to the upper side of said guideway about midway between its ends or between the limits of movement of the slide. On the side of the guideway $s$ toward the gear $h$ a cone-pointed locking-pin $v$ is fitted in a socket transverse to the slide and is pressed by a spring $w$ toward said slide, which has two corresponding depressions arranged as shown in Fig. 6. At the end opposite the slide said pin is provided with a cross-piece $x$, which is normally turned into and held in engagement with an overhanging keeper $y$ on said guideway by the spring $w$, which is coiled around said pin and attached at one end to a collar thereon and at the opposite end to the cap or end of the socket. The lower end of the cross-piece $x$ extends normally into the path of the trip-blocks $k$ and $l$. The branches $d$ of the delivery connection are provided with check-valves $z$, which close toward the valve $o$ and prevent backflow of fluid toward the chamber in the case $a$. The apparatus is preferably made portable, being mounted upon truck-wheels 2 and supported when at rest in the proper position by said wheels and by a leg 3. This form of the apparatus, as shown, is designed to control the delivery of liquid taken from a single source to different receptacles and to automatically divert the flow from one receptacle to another when a predetermined volume has been delivered to either receptacle and operates as follows: The arm $u$ being turned over to the left, as shown in Fig. 2, when the slide $r$ is locked and held by the pin $v$ and keeper $y$ in its extreme position to the right, thereby holding the valve $o$ in a position which closes the left-hand branch and leaves the right-hand branch open, as shown in Fig. 3, the liquid or other fluid will flow through the apparatus as indicated by arrows on Fig. 3. The meter-wheel $e$ will be turned and will operate, through the worms and worm-gears $f$, $g$, and $h$, to turn the trip-blocks $k$ and $l$ to the left, as indicated by an arrow on Fig. 2. When the first trip-block—for instance, the trip-block $l$—passes the cross-piece $x$, it will turn it against the tension of spring $w$ out of engagement with the overhanging keeper $y$, thereby releasing the locking-pin $v$ and the slide $r$. The spring $t$ will thereupon shift the slide $r$ to the left, thrusting the point of the locking-pin out of engagement with one conical depression in said slide and turning the valve $o$ to the right into position to close the right-hand branch $d$ and open the left-hand branch. The spring $w$, forcing the pin $v$ into the other depression in the slide $r$, and thereupon turning the cross-piece $x$ back into engagement with the keeper $y$, locks the valve $o$ in the position to which it has just been moved, so that the reversing-arm $u$ may be turned by the operator over to the right into position to shift the slide in that direction and turn the valve $o$ back to the left, when the next trip-block $k$ engages the cross-piece $x$. The volume of liquid or other fluid delivered through each branch $d$ is determined and varied by the relative positions and adjustment of the trip-blocks $k$ and $l$. For example, if it is desired to deliver, say, fifty barrels into the receptacle connected with the right-hand branch $d$ the trip-block $k$ will be set fifty points distant from the trip-block $l$, as indicated by the scale on the ring $i$, and if after the trip-block $k$ has passed the cross-piece $x$ and the valve $o$ has been shifted back to the left it is desired to deliver, say, ten barrels into the receptacle connected with the left-hand branch the trip-block $l$ is turned with the ring $i$ to the left and set ten points from the trip-block $k$, as indicated by the scale on the ring $j$. In this way after each trip-block has released the locking device and the valve $o$ has been shifted from one position to the other the operator adjusts the following trip-block according to the volume of liquid it is desired to deliver into the receptacle connected with the open delivery branch and turns the reversing-arm $u$ and spring $t$ into position for the next operation of the valve $o$, or both trip-blocks may be adjusted at once at any points which both come within the circumference of the rings. This form of apparatus with slight and obvious changes may also be used to draw predetermined quantities of different liquids from different sources and deliver them into the same receptacle.

Referring to Figs. 8 to 11, inclusive, showing a modified form of the apparatus designed to automatically divert the flow of liquid from one supply connection to another when each source of supply is exhausted, the case $a$ is provided with one delivery connection $d$ and a supply connection having two branches $b$. The switch-valve $o$ is located at the junction of the supply branches and is shifted by a reversible spring operating through a slide, rack, and pinion similar to those hereinbefore described. In the chamber with which the supply and delivery connections communicate a float 4, carried by a pivoted arm 5, is provided. To the arm 5 is pivoted a rod 6, passing upwardly through a vent-opening 7 in the top of case $a$. This rod is provided with a valve 8, which when the float is lifted by the rise of the liquid-level in said chamber closes said vent-opening. The slide $r$ has a projection 9 passing through a longitudinal slot in the guideway $s$ on the side toward the rod 6, and to the same side of said guideway are pivoted two detents 10 in position to engage with the projection 9 and lock the slide $r$ in its two extreme positions. These detents are formed and weighted so that they will operate by gravity to automatically engage with and lock said slide in either position. A lever 11, fulcrumed on top of the case $a$, has one arm projecting underneath the inner ends of the detents 10 and another arm forked to engage a nut or adjustable head on the upper end of the rod 6. The end of this lever next to the detents 10 is made heavier than the other end, so that when the float is elevated the inner weighted ends of the detents will be permitted to fall by gravity, and thereby cause their outer ends to engage with the projection 9 on the slide $r$. The branches $b$ of the supply connection are provided with check-valves $z$, opening toward the valve $o$ and preventing backflow through the apparatus. Above these check-valves sight-glasses 12 are provided for observing the condition of the liquid as it passes into the apparatus, and in the covers of these glasses are cocks 13 for releasing air entrapped therein and preventing its interfering with the operation of the apparatus, which is specially designed for use in breweries for transferring beer or other fermented liquor from one receptacle to another. For use in connection with beer or similar liquors the valve $o$ is preferably provided with a fine screen 14, as shown in Figs. 8 and 9, so arranged that the liquid must pass through it from either supply branch into the float-chamber. This form of the apparatus operates as follows: The parts of the apparatus being in the positions in which they are shown and supply and delivery connections properly made, liquid will flow through the left-hand supply branch into the float-chamber, lifting the float 4 and the valve 8 till it closes the vent-opening 7 and releases the lever 11 and detents 10. The arm $u$, with the spring $t$, is then turned by the operator from the position in which it is shown at the left to its extreme position at the right, thereby straining the spring, which tends to draw the slide $r$ in the same direction and to shift the valve $o$ to the left. Any air or free gas entrained with the beer or other liquid into the float-chamber collects in the upper part thereof until it lowers the level of the liquid sufficiently to allow the float to descend and slightly open the valve 8, whereupon the surplus air or gas will escape through the vent-opening 7 and permit the liquid to resume its normal level, and thereby close the vent. This action of the vent-valve does not, however, affect the valve $o$. When the receptacle from which the beer or other liquid is being taken is emptied, the level of the liquid in the float-chamber descends, permitting the float to drop and turn the trip-lever 11 into engagement with the inner ends of the detents 9. The slide $r$ is thus released, and the spring $t$ thereupon carries it to the right, turning the valve $o$ to the left, closing the left-hand passage and opening the right-hand passage, which has been connected with a receptacle containing beer or other liquid. The liquid-level again rises in the float-chamber, lifting the float and releasing the trip-lever 11 and detents 10, as hereinbefore explained. The operator then reverses the arm $u$ and spring $t$, turning them into position to shift the slide $r$ back to its original position. The apparatus will thus continue to operate, taking liquid from one source after another, automatically diverting the flow from one supply connection to another, provided the connections are properly made in advance with additional sources of supply, and the valve-actuating spring is reversed by the operator during the period required to empty each receptacle. In case viscous or other substances which will not readily pass through the screen 14 check the flow through the float-chamber the liquid-level will descend, allowing the float to fall and operate the tripping-lever, and the flow of liquid from the source of such viscous or other impurities will thus be automatically cut off.

Referring to Fig. 12, which illustrates another modification of the apparatus in which the switch-valve is designed to be operated by variation in pressure, the casing $a$ has a supply connection $b$ and a delivery connection $c$, with two branches $d$. The valve $o$ is located at the junction of the delivery branches $d$ and is arranged to divert the flow of fluid from one to the other, substantially the same as in the form of apparatus shown in Fig. 1. The mechanism for actuating and tripping said valve is essentially like that in the form of apparatus shown in Fig. 8 except that the tripping-lever is operated by a diaphragm or movable part which is exposed to the pressure of the fluid passing through the apparatus. A tubular casing composed of two parts 15 and 16 is mounted on top of the case $a$ over an opening therein. The part 15 is secured to the top of the case $a$, and the part 16 is threaded or adjustable in the upper end of the part 15. A diaphragm 17 is secured in said opening in the top of case $a$ and is exposed on the under side to the pressure within said case. A stem 18, provided at its lower end with a head bearing against the upper side of the diaphragm, projects upwardly therefrom and is guided at its upper end in the top of the adjustable part 16 of said casing. A spiral spring 19, surrounding said stem, bears at its lower end against a collar or shoulder on said stem and at its upper end against the top of part 16, which serves to adjust the tension of the spring. A nut on the upper end of the stem limits the downward movement thereof. The lever 11 is forked and loosely embraces said stem between the head at its lower end and the collar on which the spring bears. On top of the case $a$ is mounted an air-chamber 20, communicating with the chamber in said case and preferably made of glass or provided with a transparent section for observing the condition and level of the liquid in the apparatus. At the top of the chamber 20 is a vent-cock 21. This form of apparatus operates as follows: The valve $o$ being set to close one of the delivery branches $d$ and to open the other and locked in that position by one of the pivoted detents 10, the arm $u$ and the spring $t$ are turned into position to reverse the valve when it is tripped, as hereinafter explained. The supply and delivery connections being properly made, liquid flows into the chamber in case $a$ and is directed by valve

*o* into the open delivery branch *d*. The spring 19 being adjusted according to the predetermined conditions under which the apparatus is to operate, whenever the pressure in case *a* is increased above the normal degree—as, for instance, when the receptacle into which the liquid is delivered is filled and the flow is stopped, producing back pressure in the apparatus—the diaphragm 17 is forced upwardly against the tension of spring 19 until the head at the lower end of said stem engages the lever 11 and lifts it sufficiently to disengage the locking-detent 10 from the projection 9 on the slide *r*, thereby releasing said slide. The spring *t* thereupon shifts said slide and turns the valve *o* into its other position, opening the other branch delivery connection, with which an empty receptacle is connected. The flow of liquid through the apparatus is thereupon resumed, the pressure within case *a* is lowered, and the spring 19 forces the diaphragm 17 down to its normal position, releasing the trip-valve 11 and the detents 10, which gravitate back to locking position. The operator then reverses the arm *u* and spring *t* preparatory to the next automatic operation of the switch-valve *o*. If air or gas is entrained with or liberated from the liquid in sufficient volume to interfere with the operation of the apparatus, it collects in the chamber 20, in which its presence is indicated by the liquid-level and from which it may be drawn off from time to time by opening the cock 21.

Various changes in the minor details of construction and arrangement of parts to adapt the apparatus to different uses to which it is applicable may be made without departing from the principle and intended scope of the invention.

By the expression "to change or divert the flow of fluid from one passage or connection to another" it is intended to designate apparatus for controlling the flow of fluid from different sources as well as the delivery of fluid from the same or a single source to different receptacles. By the term "constant connection" is intended that fluid connection, either supply or delivery, which continues in service unaffected by the switch-valve, and by the term "alternating connections" is intended the plurality of like fluid connections, either supply or delivery, from one to another of which the flow of fluid is diverted by the switch-valve during the operation of the apparatus.

I claim—

1. In a fluid-switch the combination of a case having a constant and a plurality of alternating outside fluid connections, a valve arranged to change the flow of fluid from one alternating connection to another, a valve-actuating device, a locking device for holding said valve in a given position, and an automatic trip adapted to release said locking device and permit the shifting of said valve to another position, substantially as described.

2. In a fluid-switch the combination of a case having a constant and a plurality of alternating outside fluid connections, a valve arranged to change the flow of fluid from one alternating connection to another, an actuating device tending to shift said valve from one position to another, a locking device for holding said valve in a given position, an automatic trip for releasing said locking device and permitting the movement of the valve under certain conditions, and means for reversing said actuating device, substantially as described.

3. In a fluid-switch the combination of a case having a constant and a plurality of alternating fluid connections, a valve arranged to divert the flow of fluid from one alternating connection to another, a locking device for holding said valve in the desired position, an automatic trip for releasing said locking device, and a reversible spring tending to shift said valve from one position to another, substantially as described.

4. In a fluid-switch the combination of a case having a constant and a plurality of alternating fluid connections, a valve arranged to divert the flow of fluid from one alternating connection to another, a spring connected with said valve, an arm connected with and arranged to reverse said spring, a locking device for holding said valve in the desired position against the force of the spring, and a trip for releasing said locking device, substantially as described.

5. In a fluid-switch the combination of a case having a constant and a plurality of alternating fluid connections, a valve, a slide connected with and arranged to shift said valve from one position to another, a spring connected with said slide, a pivoted arm connected with and arranged to reverse and strain said spring in opposite directions, a locking device arranged to hold said slide in the desired position, and a trip for releasing said locking device, substantially as described.

6. In a fluid-switch the combination of a rotary valve having a pinion on its stem, a reciprocating slide provided with a rack engaging said pinion, a reversible actuating device arranged to shift said slide in either direction, a locking device for holding said slide in the desired position, and a trip for releasing said locking device, substantially as described.

7. In a fluid-switch the combination of a rotary valve having a pinion on its stem, a reciprocating slide having a rack meshing with said pinion, a spring connected with said slide, a pivoted reversing-arm connected with said spring, a locking device for holding said slide in a given position, and a trip for releasing said locking device, substantially as described.

8. In a fluid-switch the combination of a case having a constant and a plurality of alternating fluid connections, a valve arranged to divert the flow of fluid from one alternating connection to another, an actuating device tending to shift said valve from one position to another, a locking device for holding said valve in the desired position, a movable part in said case, and a trip connected with said movable part and adapted to release said locking device, substantially as described.

9. In a fluid-switch the combination of a case having a constant and a plurality of alternating fluid connections, a valve arranged to divert the flow of fluid from one alternating connection to another, an actuating device tending to shift said valve from one position to another, a locking device for holding said valve in the desired position, fluid-measuring mechanism in said case and a trip connected with said measuring mechanism and adapted to automatically release said valve when a predetermined volume of fluid has passed, substantially as described.

10. In a fluid-switch the combination of a case having a constant and a plurality of alternating fluid connections, a valve arranged to divert the flow of fluid from one alternating connection to another, a reversible actuating device for shifting said valve from one position to another, a locking device arranged to hold said valve in the desired position, fluid-measuring mechanism in said case, and a trip connected with said measuring mechanism and adapted to automatically release said valve when a predetermined volume of fluid has passed, substantially as described.

11. In a fluid-switch the combination of a case having a constant and a plurality of alternating fluid connections, a valve arranged to divert the flow of fluid from one alternating connection to another, an actuating device adapted to shift said valve from one position to another, a locking device arranged to hold said valve in the desired position, fluid-measuring mechanism in said case, and adjustable trips adapted to release said valve when predetermined volumes of fluid have passed, substantially as described.

12. In a fluid-switch the combination of a case having a constant and a plurality of alternating fluid connections, a valve arranged to divert the flow of fluid from one alternating connection to another, an actuating device adapted to shift said valve from one position to another, a locking device arranged to hold said valve in the desired position, meter-wheels in said case, and independently - adjustable graduated rings connected with said meter-wheels and provided with trips which are arranged to release said valve when predetermined volumes of fluid have passed said wheels, substantially as described.

13. In a fluid-switch the combination of a case having a constant and a plurality of alternating fluid connections and provided with meter-wheels, a valve arranged to divert the flow of fluid from one alternating connection to another, an actuating device adapted to shift said valve from one position to another, a locking device for holding said valve in the desired position, an annular gear having an actuating connection with said meter-wheels and provided with independently-adjustable concentric rings, and trips mounted on said rings and adapted to release said valve when predetermined volumes of fluid have passed said wheels, substantially as described.

14. In a fluid-switch the combination of a case having a constant and a plurality of alternating fluid connections and a movable part, a rotary valve arranged to divert the flow of fluid from one alternating connection to another, a reciprocating slide having a rack-and-pinion connection with said valve, a reversible actuating device connected with said slide, a rotary and longitudinally-movable locking-pin having a cross-piece and a beveled end adapted to engage depressions in said slide and to hold said valve in its different positions, a keeper arranged by engagement with said cross-piece to hold said pin in engagement with the depressions in said slide, a spring tending to turn said cross-piece into engagement with said keeper and to thrust said pin endwise into the depressions in said slide, and a trip actuated by the movable part in said case and adapted upon the occurrence of the predetermined conditions, to turn said cross-piece out of engagement with said keeper and thereby release said slide and valve, substantially as described.

15. In a fluid-switch the combination of a case having a constant and a plurality of alternating fluid connections, a rotary valve arranged to divert the flow of fluid from one alternating connection to another, a reciprocating slide having a rack-and-pinion connection with said valve, a spring attached to said slide, a pivoted arm attached to said spring and adapted to strain the same in opposite directions, a locking device for holding said slide and valve in their different positions, meter mechanism arranged to be operated by the flow of fluid through said case, and an adjustable trip connected with said meter mechanism and adapted to release said slide and valve when a predetermined volume of fluid has passed through the apparatus, substantially as described.

In witness whereof I hereto affix my signature in presence of two witnesses.

NELSON H. MEDBERY.

Witnesses:
   CHAS. L. GOSS,
   CHAS. S. SMITH.